Patented Apr. 24, 1928.

1,667,667

UNITED STATES PATENT OFFICE.

AUGUST LEOPOLD LASKA AND ARTHUR ZITSCHER, OF OFFENBACH-ON-THE-MAIN, GERMANY, ASSIGNORS TO I. G. FARBENINDUSTRIE AKTIENGESELLSCHAFT, OF FRANKFORT, GERMANY.

AZODYESTUFFS AND PROCESS OF MAKING SAME. REISSUED

No Drawing. Application filed September 10, 1925, Serial No. 55,628, and in Germany October 3, 1924.

Our invention relates to new azodyestuffs and a process of making same, said dyestuffs having probably the general formula:

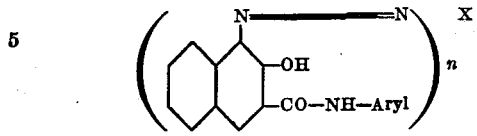

in which formula X represents the residue of a pseudoaziminobody of the general formula:

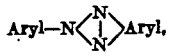

$n$ is either 1 or 2, that is, an integer greater than zero and smaller than 3, which dyestuffs are when dry scarlet red to black violet powders, soluble in sulfuric acid to a red, violet to blue solution, yielding on reduction with stannous chloride an aminopseudoaziminobody and an arylid of 1-amino-2-hydroxy-3-naphthoic acid, which dyestuffs are adapted for the production of valuable color lakes, when mixed with the usual substrata, and dye, when produced on the fiber, the vegetable fiber in scarlet red to dark violet shades of an excellent fastness, especially to kier boiling.

The materials, dyed in this manner, are also a part of the present invention.

The new dyestuffs may be obtained by combining diazotized aromatic aminopseudoaziminobodies with the arylids of 2.3-hydroxynaphthoic acid.

For the process aminosubstituted arylpseudoaziminobenzenes or arylpseudoaziminonaphthalenes may be used, one of the aromatic radicles, united with the triazol group, or both containing an aminogroup.

If the pseudoaziminobody contains one aminogroup, the combination with the arylids of 2.3-hydroxynaphthoic acid is executed in equimolecular proportions; a pseudoaziminobody, containing two aminogroups, is combined with two molecular proportions of the arylid.

The aminopseudoazimins may be obtained according to the known processes by reducing nitrosubstituted pseudoazimins or according to the process of Schmidt and Hagenböcker, which involves treating ortho-aminoazodyestuffs with cupric-oxide-ammonium salts, details of said process being described in Berichte der Deutschen Chemischen Gesellschaft, volume 54, page 2191, and in the German Letters Patent No. 338,926.

Among the compounds of this kind, not described hitherto, the following may be mentioned:

2-(2'-aminophenyl)-pseudoazimino-α-β-naphthalene, crystallizing from alcohol of 80 p. c. as feebly colored granules, melting at 120° C. (not corrected), 2-(3'-aminophenyl)-pseudoazimino-α-β-naphthalene, crystallizing from a mixture of xylene and ligroin as almost colorless granules, melting at 160° C. (not corrected), 2-(4'-aminophenyl)-pseudoazimino-α-β-naphthalene crystallizing from xylene as almost colorless granules, melting at 203-205° C. (not corrected), 2-(3'-amino-4'-methyl-phenyl)-pseudoazimino-α-β-naphthalene, obtained from a mixture of xylene and ligroin as colorless scales, melting at 172-173° C. (not corrected), 2-(3'-amino-4'-methoxy-phenyl)-pseudoazimino-α-β-naphthalene, crystallizing from xylene as feebly yellowish soft needles, melting at 185° C. (not corrected), 2-(2'-amino-4'-methylphenyl) - pseudoazimino-α-β-naphthalene, crystallizing from a mixture of alcohol and pyridine as lemon-yellow soft needles, melting at 137–136° C. (not corrected), 2-(2'-amino-4'-chlorophenyl)-pseudoazimino-α-β-naphthalene, crystallizing from xylene as feebly yellowish glassy scales, melting at 192° C. (not corrected).

As azocomponents for the process all the arylids of 2.3-hydroxynaphtholic acid may be used, such as for example the anilid, toluidids, anisidids and phenetidids, α- and β-naphthalid, arylids, chlorosubstituted in the arylido residue, the bis-2.3-hydroxynaphthoyl-arylene-diamins and so on.

The following examples illustrate the invention.

*Example 1.*

Cotton yarn, well boiled and dried, is impregnated with a solution of 10 gr. of the anilid of 2.3-hydroxynaphthoic acid, 15 cc. of caustic soda solution of 34° Bé. and 20 cc. of turkey red oil in the liter, well wrung out and without being dried developed in a diazo solution, containing 5.5 gr. of 2-(3'-amino-4'-methyl-phenyl)-pseudoazimino-α-β-naphthalene or 5.2 gr. of 2-(4'-aminophenyl)-pseudoazimino-α-β-naphthalene per liter with the addition of acetate of soda, rinsed and soaped.

In this manner by using 2-(3'-amino-4'-methyl-phenyl)-pseudoazimino-α-β-naphthalene bluish red, by using 2-(4'-aminophenyl) - pseudoazimino - α - β - naphthalene dark garnet red shades of a very good fastness to kier boiling are obtained.

In the first-mentioned case, the bluish red dyestuff formed on the fiber probably has the following formula:

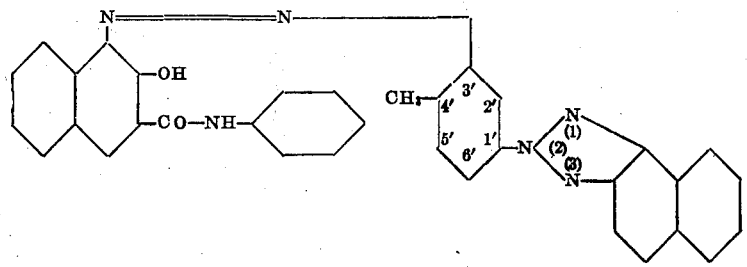

In the last-mentioned case, the dark garnet red dyestuff formed on the fiber probably has the following formula:

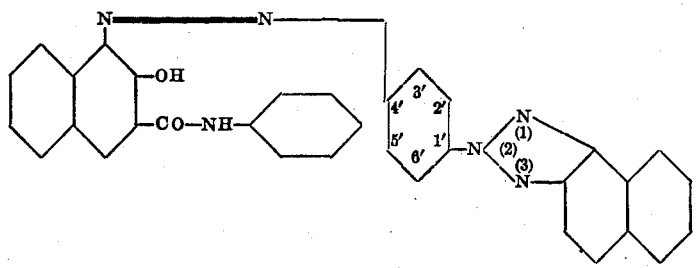

*Example 2.*

In the same manner, as described in Example 1, cotton yarn is impregnated with a solution of 4 gr. of β-naphthalid of 2.3-hydroxynaphthoic acid per liter, developed with a diazo solution, containing 5.9 gr. of 2-(2'-amino-4'-chlorophenyl)-pseudoazimino-α-β-naphthalene per liter, and worked up in the usual manner.

A red shade of a very good fastness to kier boiling is obtained.

The red dyestuff thus formed on the fiber probably has the following formula:

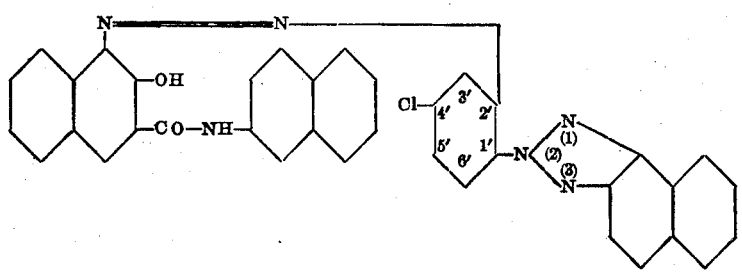

The following table gives the shades of a number of dyeings, prepared according to the present process:

| One molecular proportion of the diazocompound of: | Combined with one molecular proportion of 2.3-hydroxynaphthoyl— | Shade: |
|---|---|---|
| 2-(2'-aminophenyl)-pseudoazimino-α-β-naphthalene. | Anilin. | Scarlet. |
| Do. | β-naphthylamin. | Bluish red. |
| Do. | Ortho-chloroanilin. | Do. |
| Do. | Para-toluidin. | Red. |
| 2-(3'-aminophenyl)-pseudoazimino-α-β-naphthalene. | β-naphthylamin. | Scarlet. |
| Do. | 5-chloro-ortho-toluidin. | Red. |
| Do. | 4-chloro-ortho-anisidin. | Scarlet. |
| Do. | 5-chloro-ortho-anisidin. | Do. |
| 2-(4'-aminophenyl)-pseudoazimino-α-β-naphthalene. | α-naphthylamin. | Dark garnet red. |
| Do. | β-naphthylamin. | Do. |
| Do. | Para-phenetidin. | Do. |
| Do. | Meta-chloroanilin. | Do. |
| Do. | Meta-toluidin. | Dark claret red. |
| Do. | 5-chloro-ortho-toluidin. | Dark garnet red. |
| 2-(3'-amino-4'-methyl-phenyl)-pseudoazimino-α-β-naphthalene. | α-naphthylamin. | Bluish red. |
| Do. | β-naphthylamin. | Do. |
| Do. | Ortho-anisidin. | Bluish scarlet. |
| Do. | Para-chloroanilin. | Bluish red. |
| Do. | 4-chloro-ortho-anisidin. | Do. |
| 2-(3'-amino-4-methoxy-phenyl)-pseudoazimino-α-β-naphthalene. | Meta-nitranilin. | Bluish garnet red. |
| Do. | β-naphthylamin. | Garnet red. |
| Do. | Para-anisidin. | Dark claret red. |
| Do. | Meta-chloroanilin. | Garnet red. |
| Do. | 5-chloro-ortho-toluidin. | Do. |
| 2-(2'-amino-4'-methyl-phenyl)-pseudoazimino-α-β-naphthalene. | β-naphthylamin. | Red. |
| Do. | Meta-toluidin. | Red. |
| Do. | 5-chloro-ortho-toluidin. | Red. |
| 2-(2'-amino-4'-chlorophenyl)-pseudoazimino-α-β-naphthalene. | α-naphthylamin. | Red. |
| Do. | Ortho-anisidin. | Bluish scarlet. |
| Do. | 4-chloro-ortho-anisidin. | Red. |
| 2-(4'-aminophenyl)-pseudoaziminobenzene. | Meta-nitranilin. | Reddish violet. |
| Do. | α-naphthylamin. | Bluish dark garnet red. |
| Do. | 5-chloro-1.2-anisidin. | Bluish garnet red. |

| Two molecular proportions of the diazocompound of: | Combined with one molecular proportion of bis-2.3-hydroxynaphthoyl— | Shade: |
|---|---|---|
| 2-(2'-aminophenyl)-pseudoazimino-α-β-naphthalene. | Dianisidin. | Brownish claret red. |
| 2-(3'-amino-4'-methylphenyl)-pseudoazimino-α-β-naphthalene. | do. | Reddish brown. |
| 2-(2'-amino-4'-methylphenyl)-pseudoazimino-α-β-naphthalene. | do. | Brownish claret red. |

| One molecular proportion of the tetrazocompound of: | Combined with two molecular proportions of 2.3-hydroxynaphthoyl— | Shade: |
|---|---|---|
| 5-amino-2-(4'-amino-phenyl)-pseudoaziminobenzene. | α-naphthylamin. | Garnet red. |
| Do. | β-naphthylamin. | Dark garnet red. |
| Do. | 5-chloro-2-toluidin. | Garnet red. |

As an example, the graphical formula of next to the last example in the above table may be given as follows:

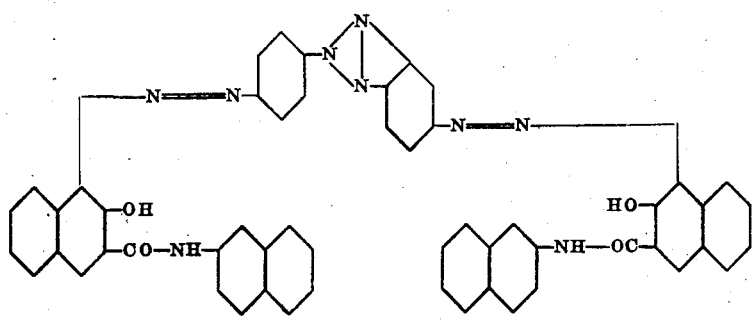

Now what we claim is:

1. As new compounds azodyestuffs, having probably the general formula:

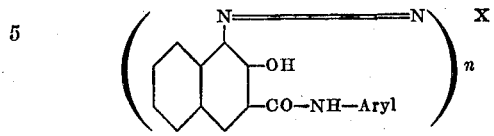

in which formula X represents the residue of a pseudoaziminobody of the general formula:

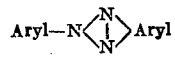

and $n$ is either 1 or 2, which dyestuffs are when dry scarlet red to black violet powders, soluble in sulfuric acid to a red, violet to blue solution, yielding on reduction with stannous chloride an aminopseudoaziminobody and an arylid of 1-amino-2-hydroxy-3-naphthoic acid, which dyestuffs are adapted for the production of valuable color lakes, when mixed with the usual substrata, and dye when produced on the fiber, the vegetable fiber in scarlet red to dark violet shades of an excellent fastness, especially to kier boiling.

2. A process of making new azodyestuffs consisting in combining diazotized aromatic aminopseudoaziminobodies with the arylids of 2.3-hydroxynaphthoic acid.

3. Materials, dyed with the azodyestuffs of claim 1, said dyestuffs being produced on the fiber of the material.

In testimony, that we claim the foregoing as our invention, we have signed our names, this 31st day of August, 1925.

AUGUST LEOPOLD LASKA.
ARTHUR ZITSCHER.